United States Patent
Iyoki

(10) Patent No.: US 7,124,201 B2
(45) Date of Patent: Oct. 17, 2006

(54) IMAGE INFORMATION TRANSMITTING SYSTEM, SCANNER APPARATUS AND USER TERMINAL APPARATUS, AND IMAGE INFORMATION TRANSMITTING SYSTEM

(75) Inventor: Yutaka Iyoki, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 585 days.

(21) Appl. No.: 10/058,117

(22) Filed: Jan. 29, 2002

(65) Prior Publication Data
US 2002/0107983 A1 Aug. 8, 2002

(30) Foreign Application Priority Data
Feb. 2, 2001 (JP) .............................. 2001-026850

(51) Int. Cl.
*G06F 15/16* (2006.01)
*G06F 7/00* (2006.01)
*H04N 1/04* (2006.01)

(52) U.S. Cl. ..................... 709/245; 709/227; 358/474; 707/10

(58) Field of Classification Search ............... 709/217, 709/222, 223, 225, 227, 237; 707/10; 358/474
See application file for complete search history.

(56) References Cited

U.S. PATENT DOCUMENTS

| | | | | |
|---|---|---|---|---|
| 5,812,819 A * | 9/1998 | Rodwin et al. | ............... | 703/23 |
| 5,911,044 A * | 6/1999 | Lo et al. | ............... | 709/203 |
| 6,167,462 A * | 12/2000 | Davis et al. | ............... | 710/5 |
| 6,223,223 B1 * | 4/2001 | Kumpf et al. | ............... | 709/227 |
| 6,327,613 B1 * | 12/2001 | Goshey et al. | ............... | 709/208 |
| 6,466,986 B1 * | 10/2002 | Sawyer et al. | ............... | 709/245 |
| 6,502,128 B1 * | 12/2002 | Kumpf | ............... | 709/221 |
| 6,839,755 B1 * | 1/2005 | Kumpf et al. | ............... | 709/225 |
| 6,880,019 B1 * | 4/2005 | Toyoda | ............... | 709/238 |
| 2001/0021037 A1 * | 9/2001 | Itoh | ............... | 358/1.15 |
| 2001/0021945 A1 * | 9/2001 | Matsuura | ............... | 709/217 |
| 2001/0039587 A1 * | 11/2001 | Uhler et al. | ............... | 709/229 |
| 2002/0040397 A1 * | 4/2002 | Choi | ............... | 709/226 |
| 2002/0133373 A1 | 9/2002 | Matsuda et al. | | |

FOREIGN PATENT DOCUMENTS

| | | |
|---|---|---|
| EP | 2001 1001584 | 5/2000 |
| JP | 2001-028655 | 1/2001 |

(Continued)

OTHER PUBLICATIONS

R. Droms, "RFC2131: Dynamic Host Configuration Protocol", Mar. 1997, XP002168114.

(Continued)

*Primary Examiner*—Rupal Dharia
*Assistant Examiner*—Chirag R Patel
(74) *Attorney, Agent, or Firm*—Greenblum & Bernstein, P.L.C.

(57) ABSTRACT

A user information registration program 68 of PC3 obtains current time from a built-in timer. Sequentially, the user information registration program 68 extracts one registration destination information from a registration destination table. The user information registration program 68 calculates lease end time from the sum of lease period and registration response reception time in extracted registration destination information and compares the calculation result with current time. If current time exceeds lease end time, the user information registration program 68 adds the IP address of network scanner 2 relating to the current registration destination to a response table 120. Sequentially, user information of PC3 is registered to the network scanner 2 (registration destination). The user information registration program 68 registers new user information to all registration destinations (network scanners 2) registered in the registration destination table.

13 Claims, 16 Drawing Sheets

FOREIGN PATENT DOCUMENTS

JP                200128655        1/2001

OTHER PUBLICATIONS

B. Aboba, "The Mini-DHCP Server", Oct. 4, 2000, XP002168115.
U.S. Appl. No. 09/343,728 to Toshihisa Sawada, filed Jun. 30, 1999 and entitled "Image Transmitting Apparatus and Image Receiving Apparatus".
U.S. Appl. No. 09/522,600 to Kiyoshi Toyoda, filed Mar. 10, 2000 and entitled "Apparatus and Method for Transmitting and Receiving for Image".

* cited by examiner

RESPONSE TABLE 120

| IP ADDRESS |
|---|
| 100.100.100.1 |
| 100.100.100.2 |
| ... |

USER MANAGING TABLE 170

| USER NAME (171) | PASSWORD (172) | IP ADDRESS (173) | LEASE PERIOD (174) | LEASE START TIME (175) |
|---|---|---|---|---|
| "YAMADA" | "ABC" | 100.100.100.1 | 60 MINUTES | 2000/09/20 10 : |
| "SUZUKI" | "XYZ" | 100.100.100.2 | 60 MINUTES | 2000/09/20 10 : |
| ... | ... | ... | ... | ... |

FIG. 17

IMAGE INFORMATION TRANSMITTING SYSTEM, SCANNER APPARATUS AND USER TERMINAL APPARATUS, AND IMAGE INFORMATION TRANSMITTING SYSTEM

BACKGROUND OF THE INVENTION

1. Field of the Invention

The present invention relates to an image information transmitting system, scanner apparatus and user terminal apparatus, and an image information transmitting system.

2. Description of the Related Art

Conventionally, a scanner is positioned on a network and image information scanned by the scanner is transmitted to a desired personal computer (PC) connected to the network. Such a scanner is referred to as a network scanner.

The network scanner converts image information to a predetermined file format (for example, TIFF), establishes a communication channel between PC and the network scanner on the network using a TCP protocol, and transfers an image file to PC through this communication channel. PC stores this image file to a hard disk and the like, and performs display, edition, and the like as required.

In order to establish the communication channel between the network scanner and PC using the protocol, it is necessary to transmit a packet, which requests for connecting to the communication channel, to an IP address of PC from the network scanner. Conventionally, regarding the IP address of PC, a user inputs it to the network scanner every time when a document is scanned. Or, the IP address is registered to memory of the network scanner in advance and the registered IP address is called up as required.

In view of the effective use of IP address, there has been recently used a DHCP server that assigns an IP address to a network terminal automatically. Under management of the DHCP server, the IP address to be assigned to PC is different every time startup occurs. Accordingly, the need arises for the user to examine the user's own IP address every time the network scanner is used. Further, the need arises for the user to frequently change the registration content of the network scanner, so that the IP address registered in memory actually becomes useless in many cases.

SUMMARY OF THE INVENTION

It is an object of the present invention is to provide an image information transmitting system which is capable of easily and surely registering the latest IP address of a user terminal apparatus to a scanner apparatus, the scanner apparatus and user terminal apparatus, and an image information transmitting method.

In order to attain the above object, the present invention provides an image information transmitting system comprising a user terminal apparatus that obtains an IP address on an IP network and a scanner apparatus that transmits image information to a network terminal apparatus using the IP address. The user terminal registers the obtained IP address to the scanner apparatus and re-registers the IP address to the scanner apparatus when an effective period of IP address elapses.

Accordingly, when the effective period (lease period) of IP address that the user terminal apparatus has obtained elapses, the IP address is re-registered to the scanner apparatus so that an appropriate new IP address is always stored to the scanner. This makes it possible to transmit image information to the user terminal apparatus from the scanner apparatus without fail.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 17 is a view illustrating a user managing table according to the above embodiment;

DETAILED DESCRIPTION OF THE PREFERRED EMBODIMENTS

An preferred embodiment of the present invention will be specifically described with reference to the accompanying drawings herewith.

Figure 1:
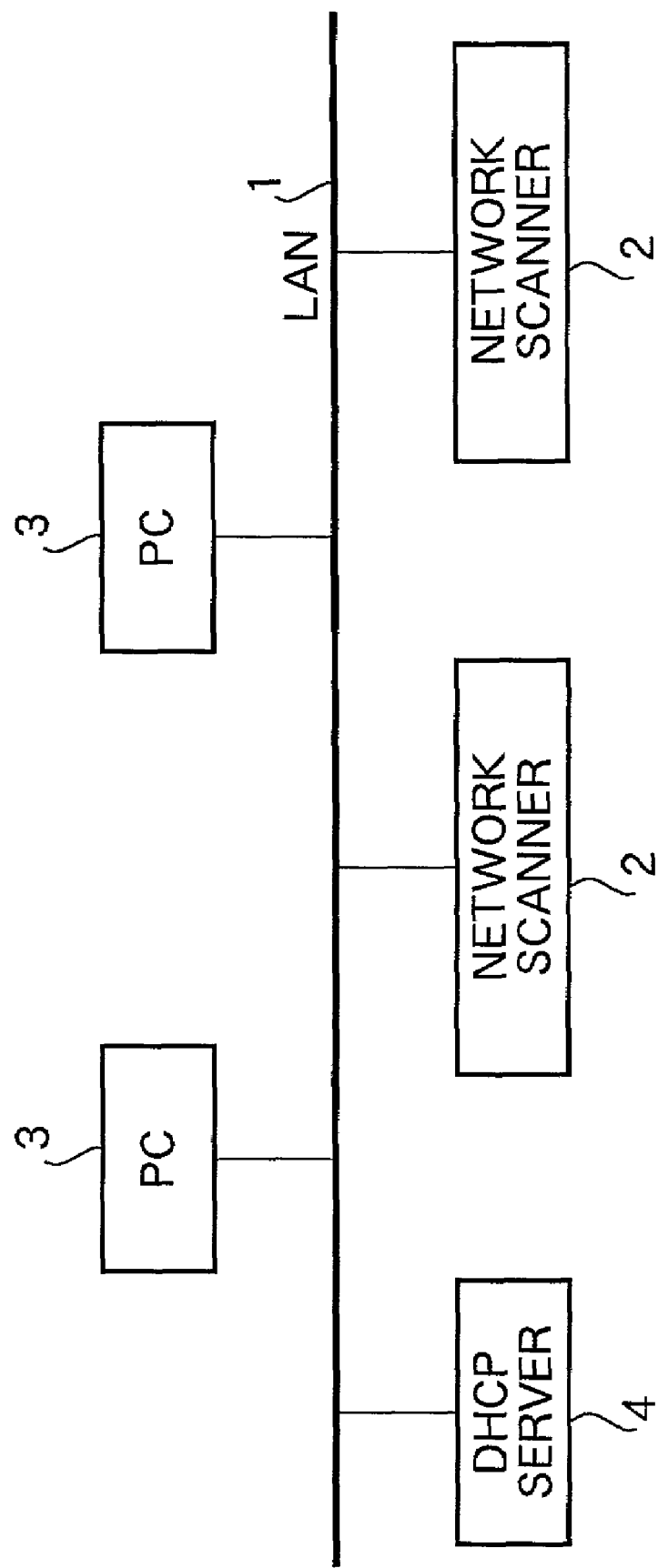
FIG. 1 is a schematic view illustrating a network system where a network scanner operates according to an embodiment of the present invention.

FIG. 1 is a schematic view illustrating a network system where a network scanner operates according to the embodiment of the present invention.

A plurality of network scanners 2 and a plurality of PCs 3, which are user terminals each using the network scanner, are connected to a network 1. These network scanners 2 and PCs 3 automatically obtain an IP address from a DHCP server 4 provided on LAN 1 at, for example, a startup time.

Figure 2:
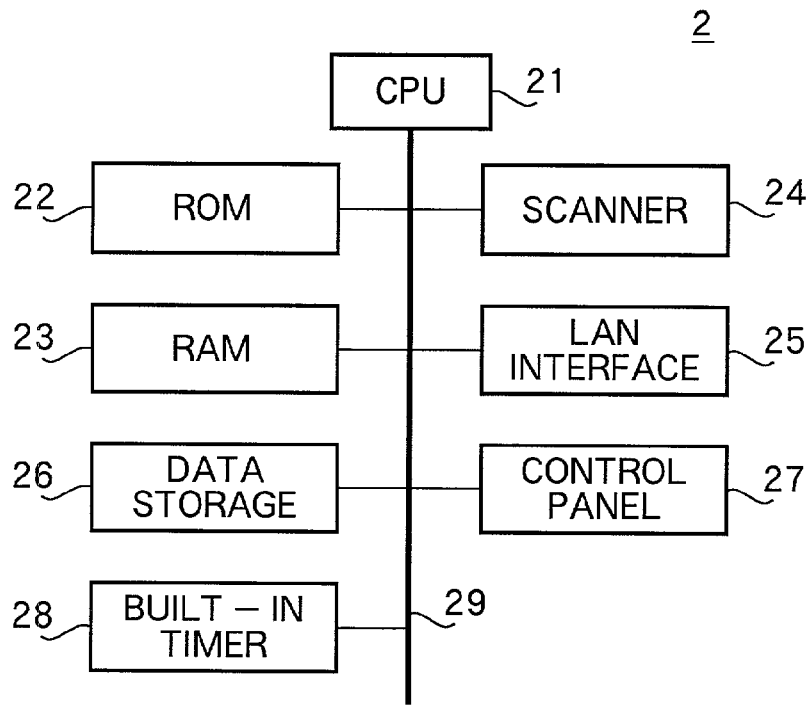
FIG. 2 is a block diagram illustrating the hardware configuration of a network scanner according to the above embodiment.

FIG. 2 is a block diagram illustrating the function of the network scanner according to the above embodiment.

The network scanner 2 includes CPU 21, ROM 22, RAM 23, scanner 24, LAN interface 25, data storage 26, control panel 27 and built-in timer 28. In this embodiment, the respective devices 22 to 28 are controllably connected to CPU 21 via a system bus 29, but the present invention is not limited to these. Here, as the storage 26, a hard disk or a flush memory device may be used. Moreover, the control panel 27 is used to read an IP address of a transmission destination from a user managing table to be described later or manually input the IP address in an unregistered case.

Figure 3:
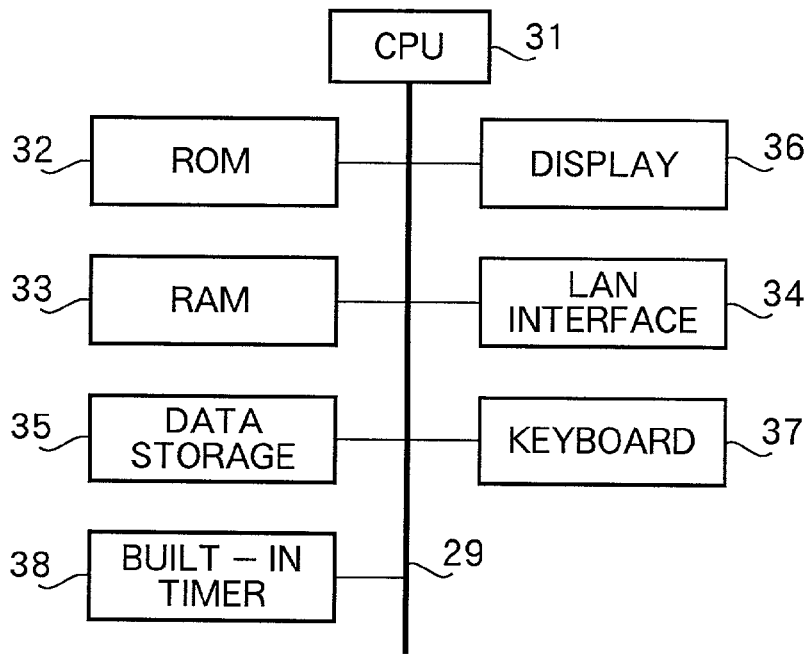
FIG. 3 is a block diagram illustrating the hardware configuration of a personal computer according to the above embodiment.

FIG. 3 is a block diagram illustrating the hardware configuration of a personal computer according to the above embodiment. PC3 includes CPU 31, ROM 32, RAM 33, LAN interface 34, data storage 35, display 36, keyboard 37, and built-in timer 38. A display device such as display 36 and input means such as keyboard 37 are arbitrary configurations, and the present invention is not limited to these.

Figure 4:
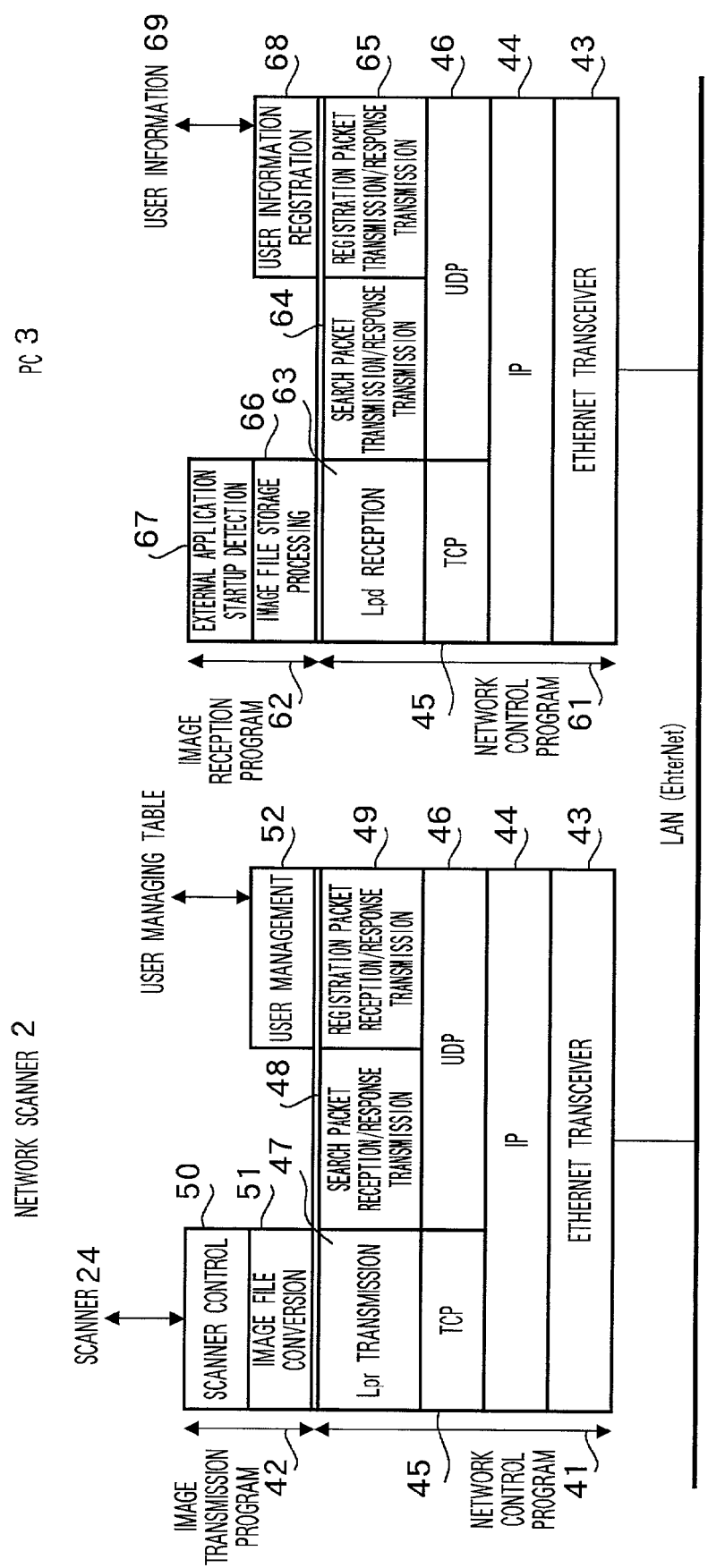
FIG. 4 is a block diagram illustrating a network configuration between the network scanner and the personal computer according to the above embodiment.

FIG. 4 is a block diagram illustrating a network configuration between the network scanner and the personal computer according to the above embodiment.

In the network scanner 2, the program executed by CPU 21 is largely divided into a network control program 41 and an image transmission program 42. The network control program 41 performs control, which is necessary for the network scanner 2 to transmit/received data to/from PC3 on LAN 1 (Ethernet). The network control program 41 includes a TCP program 45 executed based on an Ethernet transceiver 43 and an IP program 44, and a UDP program 46. The network work control program further includes an Lpr transmission program 47 that is used to transmit a TIFF file to PC3 based on an Lpr/Lpd protocol by use of the TCP program 45. The network control program 41 still further includes a search packet reception/transmission program 48 that receives a search packet to be described later and responds thereto by use of the UDP program 46. The network control program 41 still further includes a registration packet reception/transmission program 49 that receives a registration packet to be described later and responds thereto by use of the UDP program 46 similarly.

On the other hand, the image transmission program 42 handles data to be transmitted/received by use of the foregoing network control program 41. The image transmission program 42 is composed of a scanner control program 50, an image file converting program 51, and a user managing program 52. The scanner control program 50 controls the scanner 24 illustrated in FIG. 2, and scans a document so as to obtain image information. The image file converting program 51 converts image information to an image file. A data format of the image file may be, for example, TIFF, GIF, JPEG and the like, and TIFF is used in this example.

The user managing program 52 receives user information, which the registration packet reception/transmission program 49 has obtained, from PC3 and registers it to the user managing table and manages it.

Similarly, in PC3, the program executed by CPU 31 is largely divided into a network control program 61 and an image reception program 62. Similar to the network scanner 2, the network control program 61 includes the Ethernet transceiver 43, IP program 44, TCP program 45, and UDP program 46. The network control program 61 further includes an Lpd reception program 63 that is used to receive the TIFF file from the network scanner 2 based on the Lpr/Lpd protocol by use of the TCP program 45. The network control program 61 still further includes a search packet transmission/response reception program 64, which transmits a search packet to be described later or receives a response from the network scanner 2 by use of the UDP program 46. The network control program 61 still further includes a registration packet transmission/response reception program 65, which transmits a registration packet to be described later or receives a response by use of the UDP program 46 similarly.

The image reception program 62 is composed of an image file storage processing program 66, an external application startup detection program 67, and a user information registration program 68. The image file storage processing program 66 stores the image file received via the Lpd reception program 63 to the data storage 26 shown in FIG. 2. Moreover, the external application startup detection program 67 starts up an external application, which is appropriate to process the received image file. Still moreover, the user information registration program 68 generates a registration packet from user information 69, and transmits it to the network scanner 2 by use of registration packet transmission/response reception program 65.

The Lpr/Lpd protocol used in communication between the network scanner 2 and PC3 is a communication protocol, which is used to transmit/receive print data between hosts using UNIX as OS. In this Lpr/Lpd protocol, the host, which wishes to receive print service, outputs a request to a line printer daemon (Lpd), which is executed on a certain host. The daemon, which has received the request, accepts it as a job, and queues it to perform processing.

Figure 5:
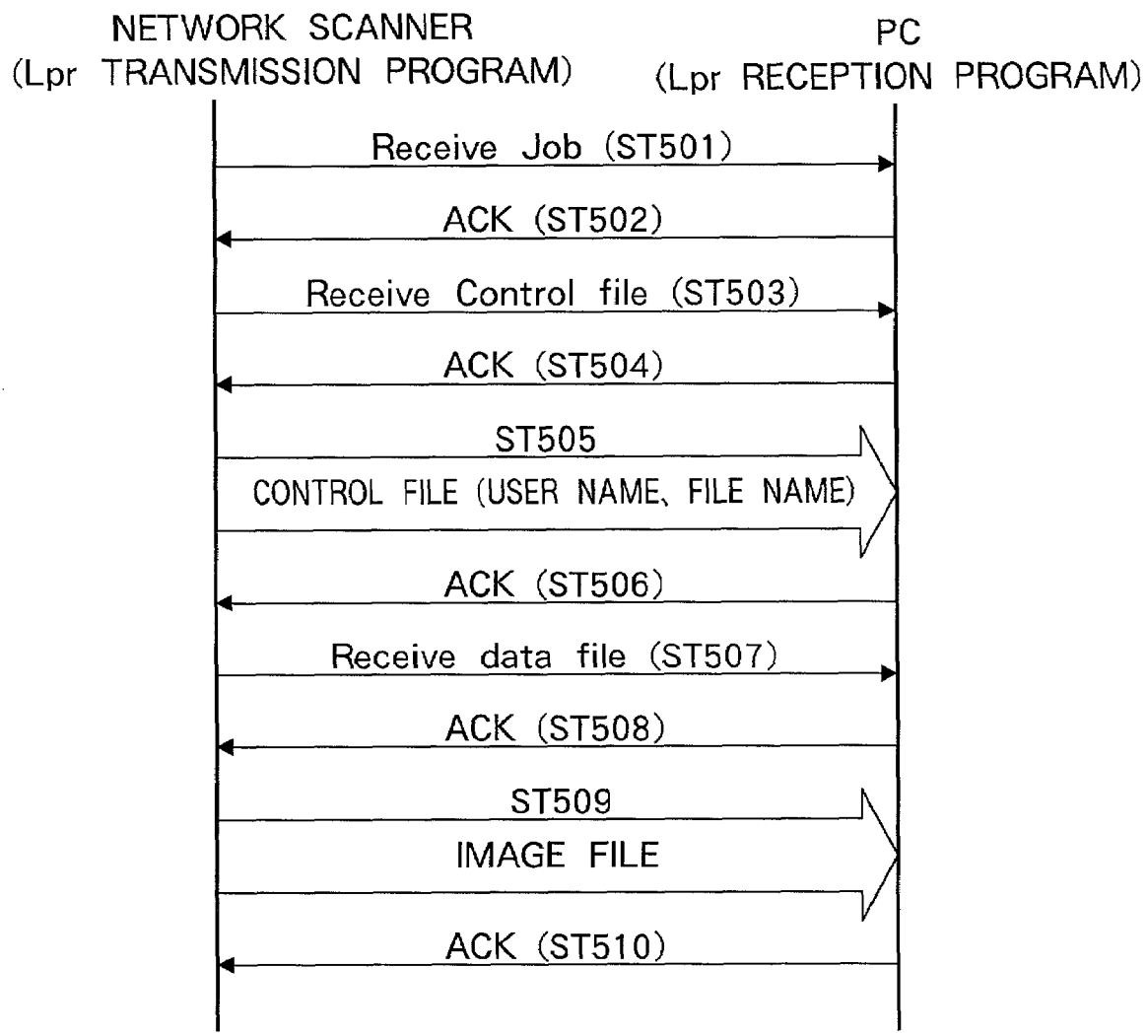
FIG. 5 is a sequence view illustrating an image file transfer between the network scanner and the personal computer according to the above embodiment.

FIG. 5 is a sequence view illustrating an image file transfer carried out between the network scanner and the personal computer according to the above embodiment.

As illustrated in FIG. 5, the Lpr transmission program 47 of the network scanner 2 transmits a command "Received Job" instructing the reception of job to the Lpd reception program 63 of PC3 (ST501). In response to this, if the Lpd reception program 63 of PC3 sends back ACK to the Lpr transmission program 47 (ST502), the Lpr transmission program 47 transmits a sub-command "Receive control file" instructing the reception of control file to the Lpd reception program 63 (ST503). This sub-command includes the size of control file and the name of control file name.

In response to this, if the Lpd reception program 63 sends back ACK (ST504) to the Lpr transmission program 47, the Lpr transmission program 46 transmits the control file to the Lpd reception program 63 (ST505). This control file includes a user name, a file name of image file, and the like.

Next, if the Lpd reception program 63 completes the reception of control file and sends back ACK to the Lpr transmission program 47 (ST506), the Lpr transmission program 47 transmits a sub-command "Receive data file" representing the transmission of image file to the Lpd reception program 63 (ST507). If the Lpr transmission program 47 confirms that the Lpd reception program 63 has sent back ACK to the Lpr transmission program 47 (ST508), the Lpr transmission program 47 transmits an image file to the Lpd reception program 63 (ST509). If the reception of image file is completed, the Lpd reception program 63 sends back ACK to the Lpr transmission program 47 (ST510).

Since the foregoing Lpr/Lpd protocol used in the foregoing image file transfer is based on TCP, the transmission/reception of command, sub-command, control file and data file is carried out on not a packet-by-packet basis but a stream-by-stream basis. In other words, connection between the network scanner 2 and PC3 is established and then communication is carried out. Accordingly, in order to perform data transmission to PC3 from the network scanner 2, the network scanner 2 must know the IP address of PC3 at the transmitting time. Moreover, in order to register the IP address to a user managing table 170 together with the user name, the network scanner 2 must obtain the IP address and other relevant information.

Figure 6:
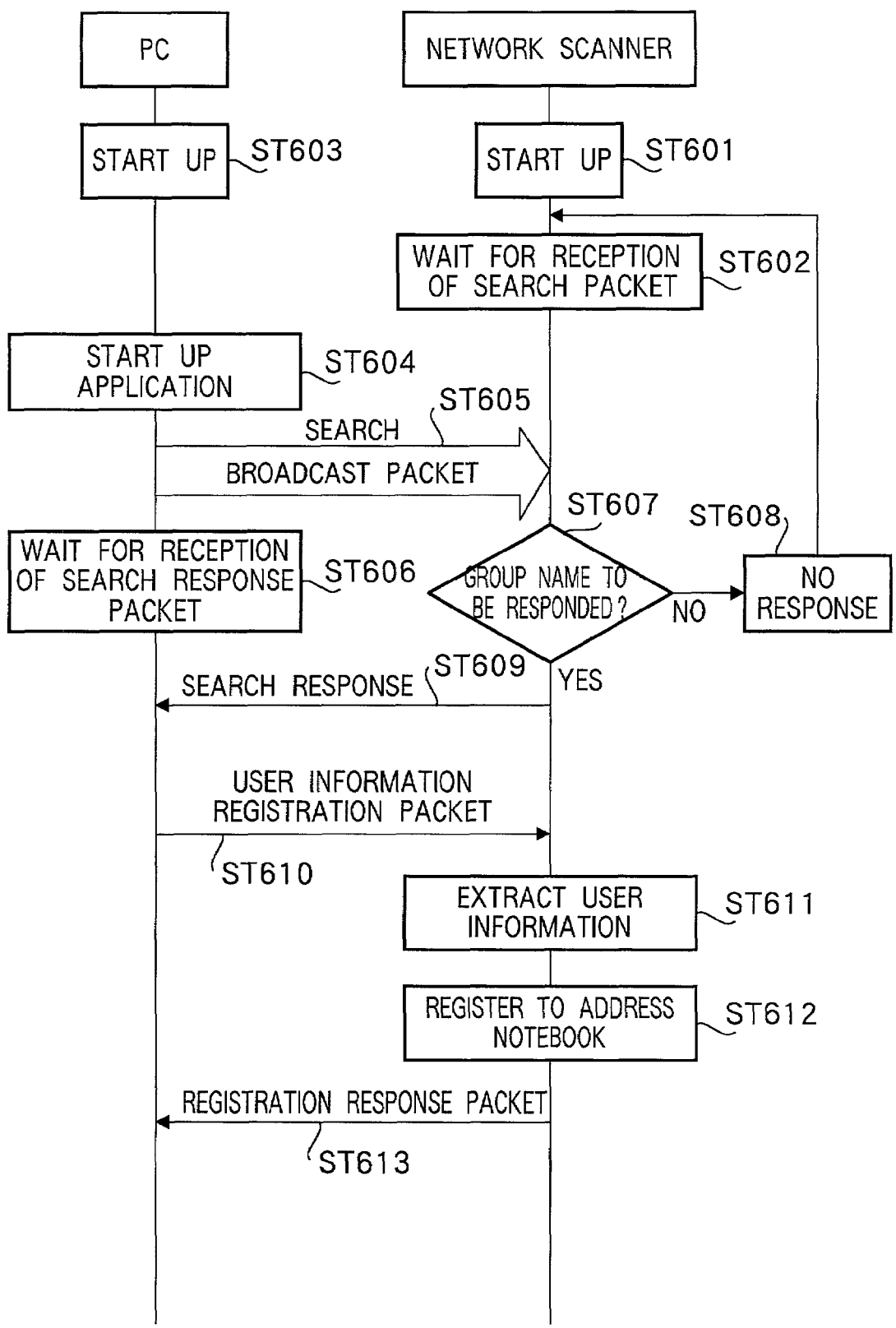
FIG. 6 is a flowchart illustrating an operation for a user information registration carried out between the network scanner and the personal computer according to the above embodiment.

An explanation will be next given of an IP address obtaining method at the network scanner according to the present embodiment. FIG. 6 is a flowchart illustrating an operation for a user terminal information registration carried out between the network scanner and the personal computer according to the above embodiment.

When the network scanner 2 is started up (ST601), the search packet reception/transmission program 48 monitors a packet with a specific port number on the network 1 (ST602). On the other hand, when PC3 is started up (ST603) and the external application startup detection program 67 detects the startup of the external application (ST604), PC3 performs the search of the network scanner 2 on the network 1. It should be noted that the search be carried out by an instruction from the user.

First, in the search of network scanner 2, the search packet transmission/response reception program 64 broadcasts the search packet on the network 1 (ST605) and waits for the response (ST606).

Figure 7:
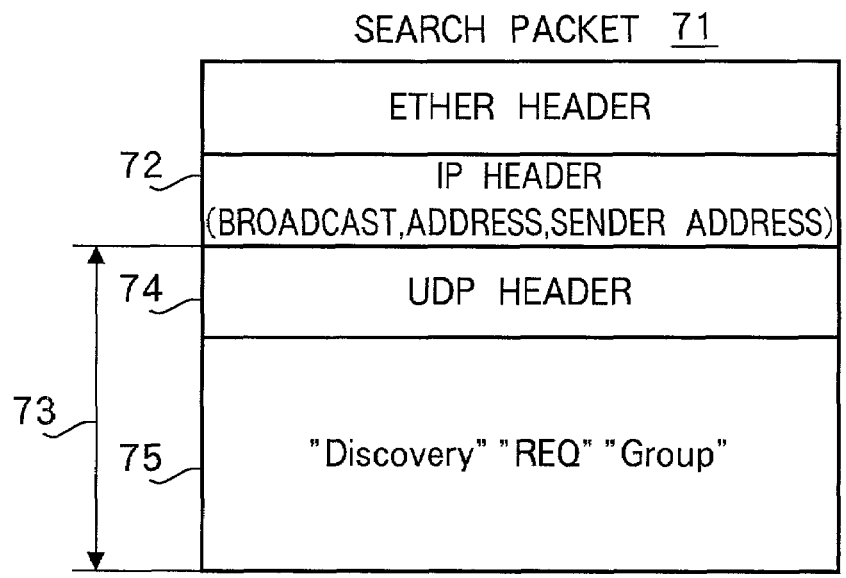
FIG. 7 is a view showing a frame format of a search packet according to the above embodiment.

FIG. 7 is a view showing a frame format of a search packet according to the above embodiment. A UDP packet is used as a search packet 71. At an IP heater 72 of the search packet 70, a broadcast address (for example, 255.255.255.255) is specified in a destination address field and IP address of PC3 is specified in a sender address field.

Moreover, at an UDP header 74, which is positioned at the top of an IP data field 73, the same port number that the search packet reception/transmission program 48 of the network scanner 2 monitors is specified as a destination port number.

Still moreover, subsequent to the UDP header 74, an UDP data field 75 includes various kinds of information indicating that this packet is a search packet. Namely, the UDP data field 75 includes information "Discovery" indicting that this packet relates to an automatic registration of user terminal information, information "REQ" indicating that this packet relates to a processing request, and information "Group" indicating a group name to which the sender of the packet belongs.

Since a UDP protocol is a connectionless type communication protocol that does not have to establish the connection unlike the TCP protocol, it is suitable for searching the network scanner 2.

Turning back to FIG. 6, the search packet reception/transmission program 48 of the network scanner 2 receives the search packet 71, recognizes information "Group", and determines whether or not this is the group name to which a response should be given (ST607). For example, if the group name matches the name of a group to which the search packet reception/transmission program 48 belongs, the search packet reception/transmission program 48 determines that a response should be given. If it does not match, the search packet reception/transmission program 48 determines that a response should not be given. In the case where it is determined that a response should not be given, the network scanner returns to a search packet waiting state without giving any response (ST608). On the other hand, in the case where it is determined that a response should be given, the search packet reception/transmission program 48 sends back the search response packet to PC3 (ST609). In the case where PC3 transmits the search packet 71 including no information "Group", the network scanner 2 determines that this is the search from the other group and gives a response without fail.

Figure 8:
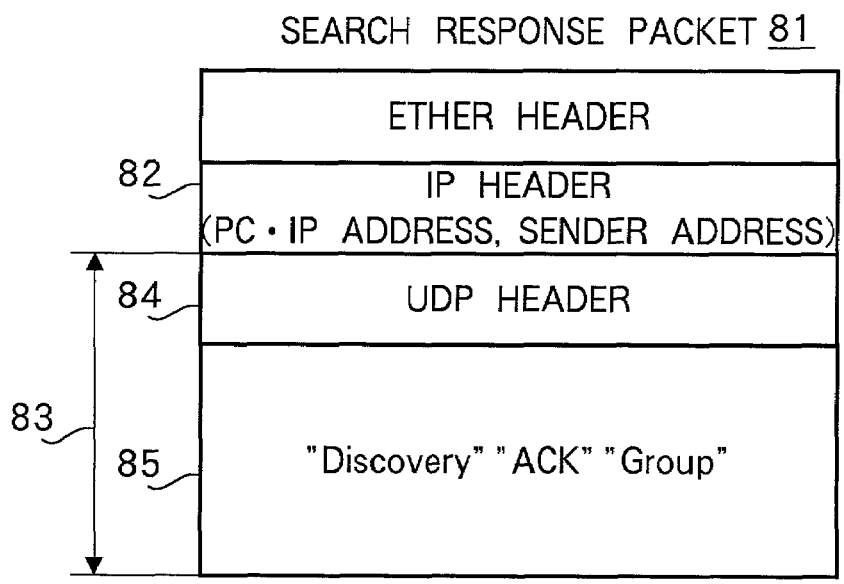
FIG. 8 is a view showing a frame format of a search response packet according to the above embodiment.

FIG. 8 is a view showing a frame format of a search response packet according to the above embodiment. A UDP packet is used as this search response packet 81. At an IP heater 82 of the search response packet 81, a sender of the search packet 71, that is, an IP address of PC3 (hereinafter referred to as PC. IP address) is specified in a destination address field and an IP address of the network scanner 2 is specified in a sender address field.

Moreover, at an UDP header 84, which is positioned at the top of an IP data field 83, the same port number that the search packet reception/transmission program 48 of PC 3 monitors is specified as a destination port number.

Still moreover, an UDP data field 85 includes various kinds of information indicating that this packet is a search response packet. Namely, at the search packet 71 shown in FIG. 7, information "ACK" indicating that the packet relates to a processing response is used in place of information "REQ" indicating that the packet relates to a processing request.

Turning back to FIG. 6, when PC3 receives the search response packet 81, the registration packet transmission/response reception program 65 of PC3 transmits the registration packet including user information to the network scanner 2 (ST610).

Figure 9:
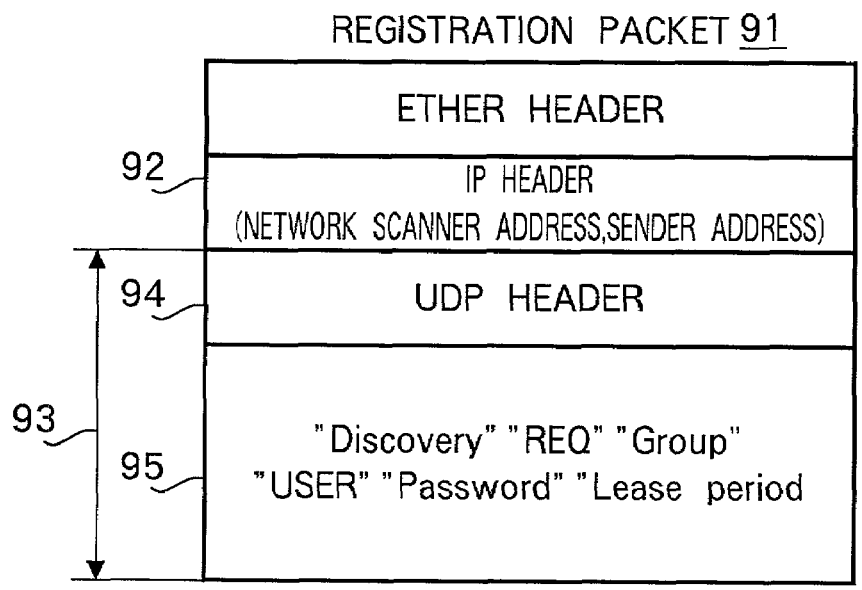
FIG. 9 is a view showing a frame format of a registration packet according to the above embodiment.

FIG. 9 is a view showing a frame format of a registration packet according to the above embodiment. A UDP packet is used as this registration packet 91. At an IP heater 92 of the registration packet 91, the IP address of the network scanner 2 that has sent back the search response packet 81 is specified in the destination address field. Moreover, an IP address of PC 3 is specified in the sender address field.

Moreover, at an UDP header 94, which is positioned at the top of an IP data field 93, the same port number that the registration packet reception/transmission program 49 of the network scanner 2 monitors is specified as a destination port number.

Still moreover, an UDP data field 95 includes information "USER" indicative of a user name, information "Lease period" indicative of lease period and information "Password" indicative of a password specified by the user, in addition to information "Discovery", "REQ" and "Group." The lease period is decided by PC3 or its user. A lease period starting time is time when user information is registered. In other words, since the lease period is the same but the lease starting time differs, it is necessary to manage the lease period on a user-by-user basis. It should be noted that the lease period is endless (0xffffffff) in the case where the IP address of PC3 is fixed.

Turning back to FIG. 6, when the registration packet reception/transmission program 49 of the network scanner 2 receives the registration packet 91, the user managing program 52 extracts user terminal information from the registration packet 91 (ST611), and registers it to the user managing table 170 (ST612). Thereafter, the registration packet reception/transmission program 49 transmits a registration response packet 101 to PC3 to inform PC3 that registration has completed (ST613).

Figure 10:
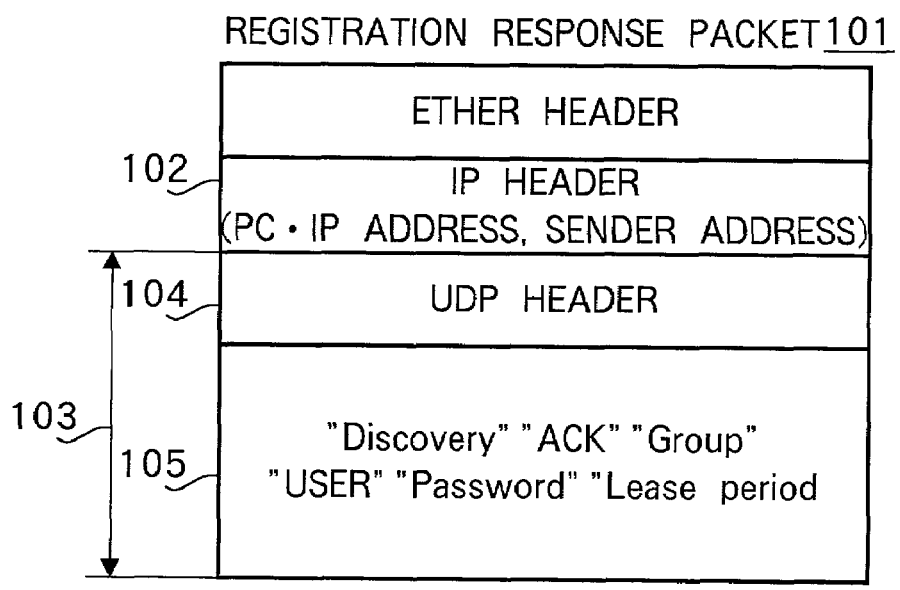
FIG. 10 is a view showing a frame format of a registration response packet according to the above embodiment.

FIG. 10 is a view showing a frame format of a registration response packet according to the above embodiment. A UDP packet is used as this registration packet 101. At an IP heater 102 of the registration packet 101, a sender of the registration packet 91, that is, a PC. IP address is specified in the destination address field. Moreover, an IP address of the network scanner 2 is specified in the sender address field.

Moreover, at an UDP header 104, which is positioned at the top of an IP data field 103, the same port number that the registration packet reception/transmission program 49 of PC3 monitors is specified as a destination port number.

Still moreover, an UDP data field 105 includes various kinds of information indicating that this packet is a registration response packet. Namely, at the registration packet 91 shown in FIG. 9, information "ACK" indicating that the packet relates to a processing response is used in place of information "REQ" indicating that the packet relates to a processing request.

A further explanation will be given of the operations of the network scanner 2 and PC3 in the foregoing flow of the user terminal information registration.

Figure 11:
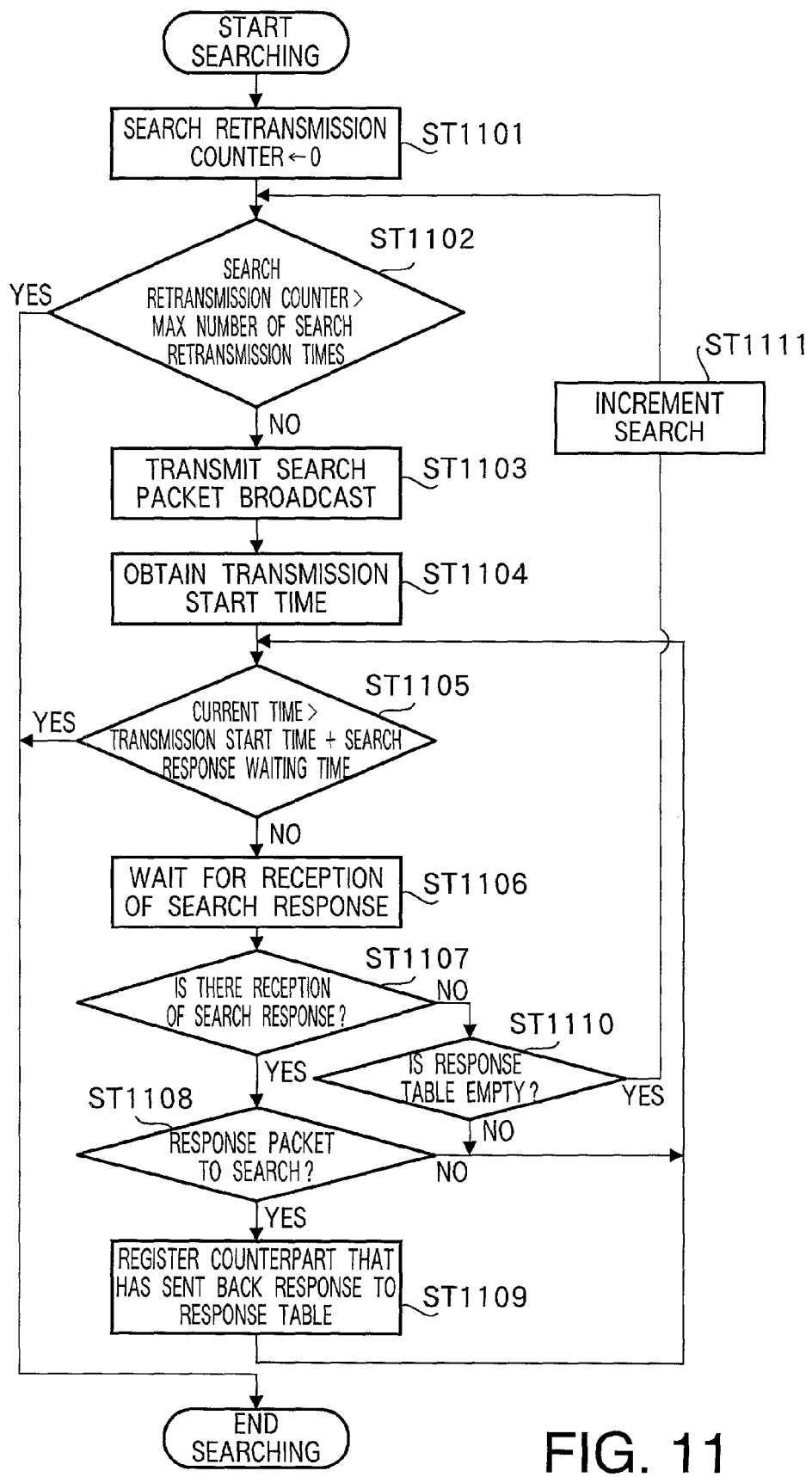
FIG. 11 is a flowchart illustrating steps for search processing of the network scanner by the personal computer according to the above embodiment.

FIG. 11 is a flowchart illustrating steps for search processing of the network scanner by the personal computer according to the above embodiment.

In PC3, the search packet transmission/response reception program 64 resets a search retransmission counter to zero (ST1101). Next, the search packet transmission/response reception program 64 determines whether or not the search retransmission counter exceeds a maximum number of search retransmission times (ST1102). Since the search retransmission counter=0 at first, the determination result is "NO" and processing goes to ST1103. In ST1103, the search packet transmission/response reception program 64 broadcasts the search packet 71 on the network 1. Next, the search packet transmission/response reception program 64 obtains transmission start time from a built-in timer 38 of PC3 (ST1104). After that, the search packet transmission/response reception program 64 determines whether or not current time (obtained from the built-in timer 38) is greater than the sum of transmission start time and a total amount of search response waiting time, that is, whether or not a predetermined total amount of search response waiting time has elapsed since broadcast transmission (ST1103) (ST1105).

In the case where the result in ST1105 is "NO", the search packet transmission/response reception program 64 waits for the reception of search response until predetermined search response waiting time per one time elapses (ST1106). The search packet transmission/response reception program 64 determines whether or not the search response packet 81 is received while waiting for the reception (ST1107). In the case where the determination result is "YES", the search packet transmission/response reception program 64 determines whether or not the received search response packet 81 is one that responds to the search packet 71 transmitted by the search packet transmission/response reception program 64 (ST1108). This can be carried out by, for example, determining whether information of the UDP data field of the search response packet 81 is "Discovery" and the processing response is "ACK" or not. In the case where the determination result is "YES", the IP address of network scanner 2 obtained from the search response packet 81 is registered to a response table 120 shown in FIG. 12 (ST1109). After registration, processing goes back to ST1105.

If the determination result is "NO" in ST1108, the received search response packet 81 is not one that responds to the search packet 71 transmitted by the search packet transmission/response reception program 64 so that the search response packet 81 is abandoned and processing goes back to ST1105.

In the case where the determination result is "NO" in ST1107, that is, no search response packet 81 is received, the search packet transmission/response reception program 64 determines whether or not the response table 120 is empty (ST1110). Here, in the case where the determination result is "YES", the search packet 71 disappears on the LAN 1 for some reason and does not reach any network scanner 2 in some cases. For this reason, in order to retransmit the search packet 71, the search retransmission counter is incremented by one (ST1111) and processing goes back to ST1102. Sequentially, after determining whether or not the search retransmission counter exceeds a maximum value in ST1102, processing in ST1103 to ST1109 is repeated. Accordingly, the retransmission of search packet 71 is carried out up to the maximum number of the search retransmission times.

On the other hand, if the determination result in step ST1110 is "NO", the search packet 71 is effectively transmitted, so that processing goes back to ST1105. Then, processing in ST1106 to ST1109 is repeated, so that the search packet transmission/response reception program 64 waits for a response from the network scanner 2 until time that has elapsed since broadcast transmission (ST1103) reaches the total amount of search response waiting time.

In this way, PC3 can search all available network scanners 2, which exist on the LAN 1, and obtain the corresponding IP addresses. Moreover, PC3 can search the network scanners 2 without fail even if the search packet disappears or delay in response time of network scanner 2 occurs.

An explanation will be next given of network scanner 2 when PC3 can search the network scanner 2.

Figures 12, 13:
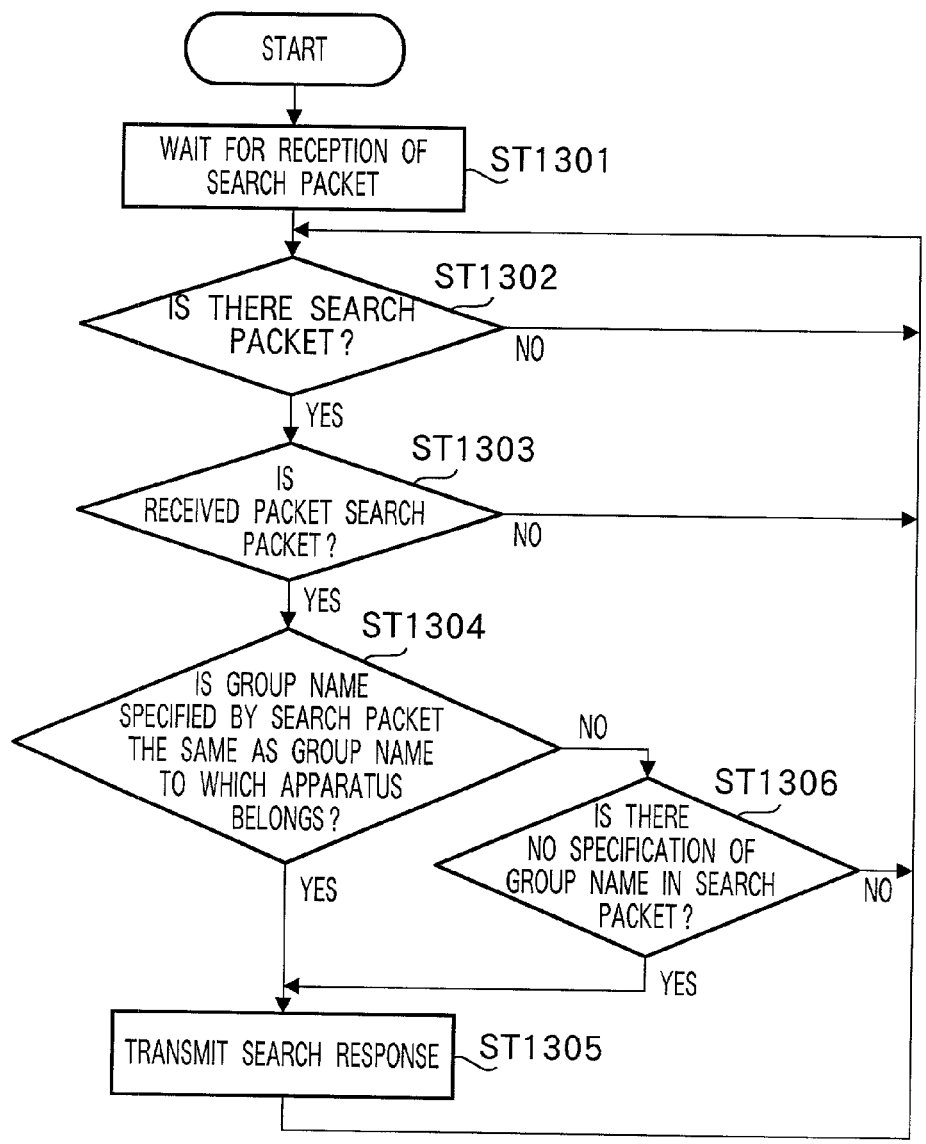
FIG. 12 is a view illustrating a response table according to the above embodiment.
FIG. 13 is a flowchart illustrating steps for responding to the search from the personal computer by the network scanner according to the above embodiment.

FIG. 13 is a flowchart illustrating steps for responding to the search from the personal computer by the network scanner according to the above embodiment.

In the network scanner 2, the search packet reception/transmission program 48 normally waits for the reception of search packet 71 from PC3 (ST1301). If the search packet reception/transmission program 48 receives the packet (ST1302), the search packet reception/transmission program 48 checks whether or not the received packet is search packet 71 (ST1302). If "Discovery" and "REQ" are included in the received packet as illustrated in FIG. 7, the search packet reception/transmission program 48 determines that the received packet is search packet 71.

If the received packet is search packet 71 (YES) in ST1303, the search packet reception/transmission program 48 recognizes the group name of PC3 from information "Group" included in the search packet 71, and checks whether or not the group name matches the name of the group to which the network scanner 2 belongs (ST1304). If they match each other (YES), the search packet reception/transmission program 48 prepares the search response packet 70 including the IP address of the network scanner 2 and transmits it to PC3 (ST1305). If they do not match (NO), the search packet reception/transmission program 48 checks whether or not the search packet 71 includes information "Group" (ST1306). If the search packet does not include information "Group", the search packet reception/transmission program 48 determines that this is the search from the other group, and processing moves to ST1305 to transmit the search response packet 81. In this way, the network scanner 2 responds to the search from PC3 and notifies PC3 of the IP address of the network scanner 2.

An explanation will be next given of steps for registering user terminal information to the network scanner 2 by PC3.

Figure 14:
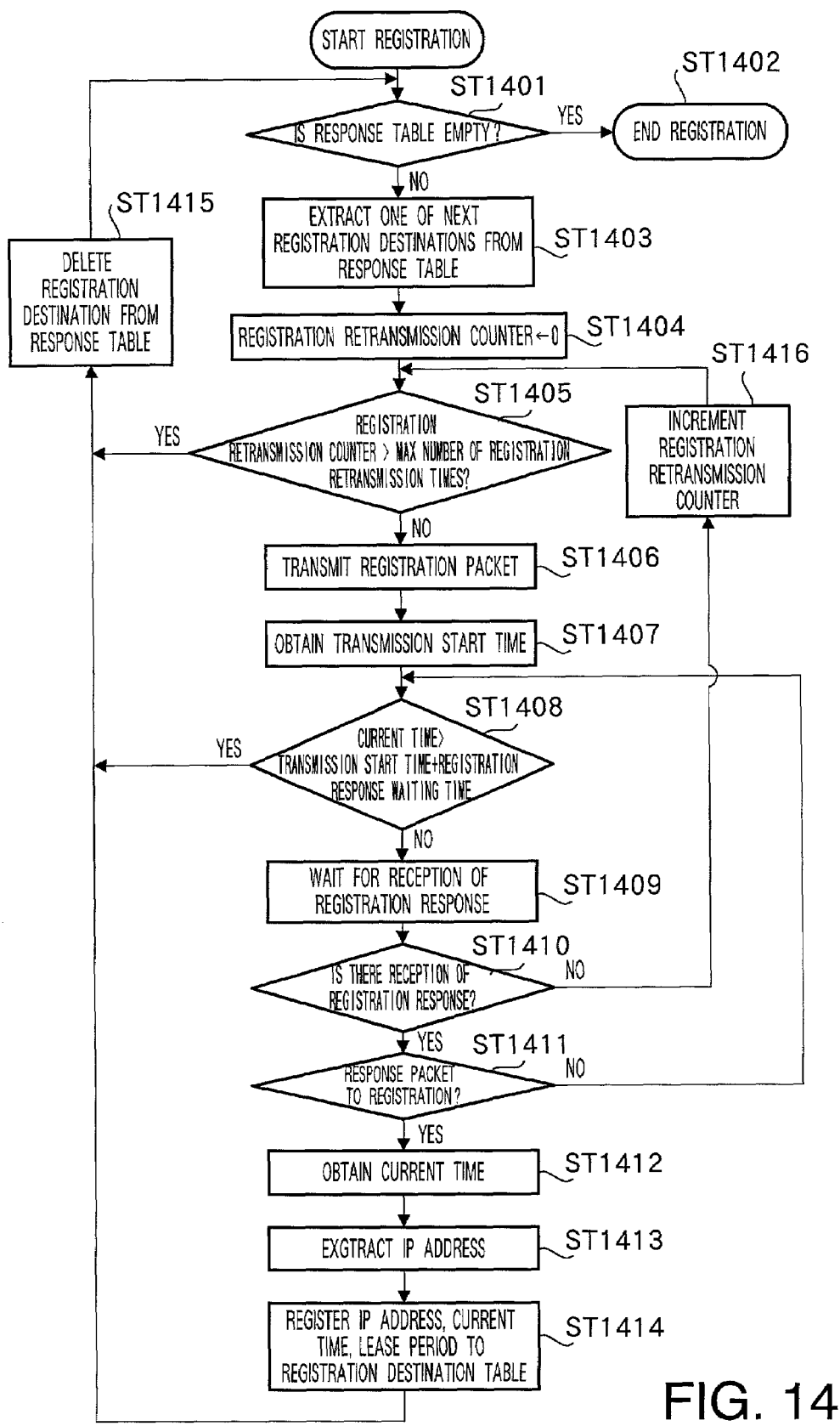
FIG. 14 is a flowchart illustrating steps for registering user terminal information to the network scanner in the personal computer according to the above embodiment.

FIG. 14 is a flowchart illustrating steps for registering user terminal information to the network scanner in the personal computer according to the above embodiment.

In PC3, the user information registration program 68 determines whether or not the response table 120 shown in FIG. 12 is empty (ST1401). If it is empty (YES), the user information registration program 68 ends the registration steps (ST1402). If it is not empty (NO), the user information registration program 68 extracts the IP address (registration destination) of a first network scanner 2 from the top of the response table 120 (ST1403). Next, the user information registration program 68 resets a registration retransmission counter to zero (ST1404). After that, the user information registration program 68 determines whether or not the registration retransmission counter exceeds a maximum number of registration retransmission times (ST1405). If the determination result is NO, the user information registration program 68 prepares the registration packet 91 shown in FIG. 8 and transmits it to the network scanner 2 (ST1406).

After transmitting the registration packet 91, the user information registration program 68 obtains transmission start time from the built-in timer of PC3 (ST1407). Next, the user information registration program 68 determines whether or not current time is greater than the sum of transmission start time and a total amount of registration response waiting time, that is, whether or not a predetermined total amount of registration response waiting time has elapsed since the start of transmission (ST1408).

Figure 15:
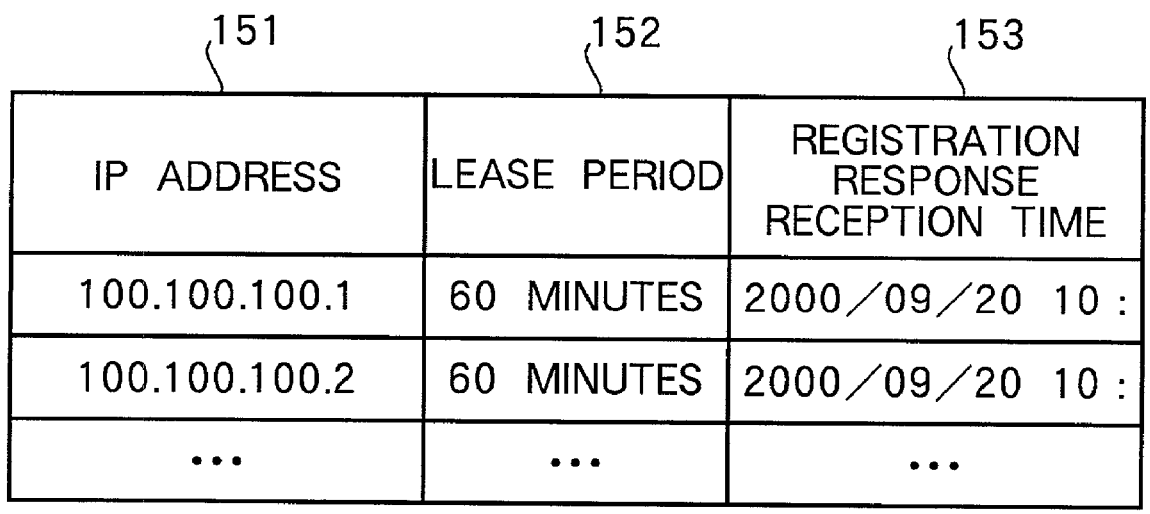
FIG. 15 is a view illustrating a registration destination table according to the above embodiment.

In the case where the result in ST1408 is "NO", the user information registration program 68 waits for the registration response packet 101 from the network scanner 2 until predetermined registration response waiting time per one time elapses (ST1409). After that, the user information registration program 68 determines whether or not the registration response packet 101 is received (ST1410). If the determination result is "YES", the user information registration program 68 determines whether or not the registration response packet 101 is one that responds to the registration packet 91 transmitted by PC3 (ST1411). If the determination result is "YES" in ST1411, the user information registration program 68 obtains current time from the built-in timer of PC3 (ST1412) or extracts the IP address of network scanner 2, which has responded, from the registration response packet 101 (ST1413). Then, the user information registration program 68 registers current time to a registration destination table 150 as registration response reception time and registers the IP address and lease period thereto (ST1414). FIG. 15 is a view illustrating a registration destination table according to the above embodiment. In the registration destination table 150, an IP address 151 of network scanner 2 responded as mentioned above, lease period 152 and registration response reception time 153 are registered to be associated with one another.

After the registration to the registration destination table 150 is ended, the registration destination is deleted from the registration destination table 120 (ST1415), processing goes back to ST1401 to carry out steps for registering user terminal information to a next registration destination.

On the other hand, if the determination result is "NO" in ST1410, since there is a possibility that the registration packet 91 will disappear, the registration retransmission counter is incremented by one (ST1416), and processing goes to ST1405. Then, the user information registration program 68 confirms whether or not the registration retransmission counter exceeds the maximum number, and retransmits the registration packet 91, and processing in steps 1405 to 1410 is repeated. Moreover, in the case where the determination result is "NO" in ST1411, the user information registration program 68 abandons the registration response packet 101 and goes back to ST1408, and processing in ST1408 to 1411 is repeated. In this way, there is a case in which the value of the registration retransmission counter exceeds a maximum number of registration retransmission times in ST1405. Or, there is a case in which elapsed time since the transmission of registration packet exceeds the total amount of registration response waiting time in ST1408. In either case, the registration destination is in a state that it cannot response for the reason of power-down of the source of registration destination. For this reason, PC3 abandons the registration to the registration destination and moves to steps for registration to a next registration destination. In this way, PC3 performs the registration of user terminal information to all registration destinations registered in the response table.

Figure 16:
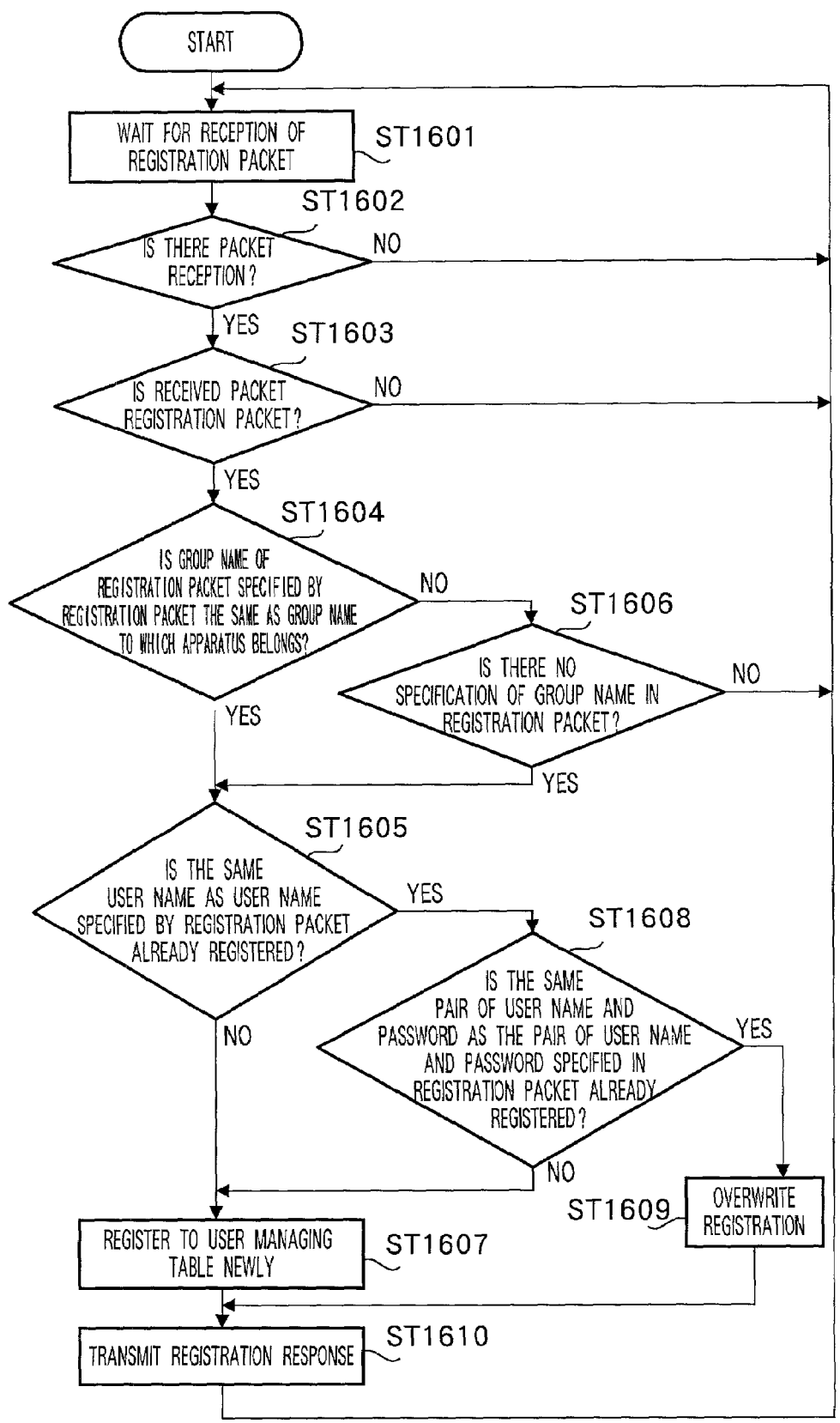
FIG. 16 is a flowchart illustrating steps for responding to the user registration from the personal computer by the network scanner according to the above embodiment.

FIG. 16 is a flowchart illustrating steps for responding to the user registration from the personal computer by the network scanner according to the above embodiment.

The network scanner 2 normally waits for the reception of registration packet 91 from PC3 (sT1601). If the network scanner 2 receives the packet (ST1602), the network scanner 2 checks whether the received packet is the registration packet 91 or not (ST1603). If "Discovery", "REQ" and "USER" are included in the received packet as illustrated in FIG. 9, the network scanner 2 determines that the received packet is the registration packet 91.

If the received packet is the registration packet 80 (YES) in ST1603, the network scanner 2 recognizes the group name of PC3 from information "Group" included in the registration packet 91, and checks whether or not the group name matches the name of the group to which the network scanner 2 belongs (ST1604). If they match each other (YES), processing goes to ST1605. While, if they do not match (NO), the network scanner 2 checks whether or not information "Group" is included in the registration packet 91 in ST1606. If it is not included therein (YES), the network scanner 2 determines that this is the request for registering user terminal information from the other the group, and processing moves to ST1605.

In ST1605, the network scanner 2 searches the user managing table 170 using information "USER" included in the registration packet 91, and checks whether or not the same user name is already registered. FIG. 17 is a view illustrating a user managing table according to the above embodiment. In the user managing table 170, a user name 171 of a terminal serving as a transmission destination such as PC and the like, password 172, IP address 173, lease period 174 and least start time 175 are registered to be associated with one another.

If the result is "NO" in ST1605, the network scanner 2 newly registers user terminal information such as a user name extracted from the registration packet 91, PC. IP address, group name, password and the like to the user managing table 170 (ST1607).

On the other hand, if the result is "YES" in ST1605, the network scanner 2 checks whether or not the user name and password, which are already registered as user terminal information, match the user name and password, which are indicated by each of information "USER" and "Group" included in the registration packet 91 (ST1608). If the result is "YES" in ST1308, the network scanner 2 determines that both are the same and overwrites the existing user terminal information onto the user managing table 170 using user terminal information extracted from the registration packet 91 (ST1609). On the other hand, if the result is "NO" in ST1608, the network scanner 2 determines that both are not the same and newly registers user terminal information to the user managing table 170 (ST1607). This prevents user terminal information from being erroneously overwritten.

When the registration in ST1607 or ST1609 is ended, the network scanner 2 prepares the registration response packet 101 and transmits it to PC3 (ST1610), and returns to a reception waiting state for registration packet 91 (ST1601). As is appreciated from the foregoing description, the network scanner 2 extracts user terminal information upon receiving the registration packet 91 from PC3, making it possible to newly register the extracted user terminal information to the user managing table 170 or update it.

The following will explain the steps in which the network scanner 2 scans a document and transmits digital image data to PC3 using user terminal information registered to the network scanner 2 from PC3 as mentioned above.

Figure 18:
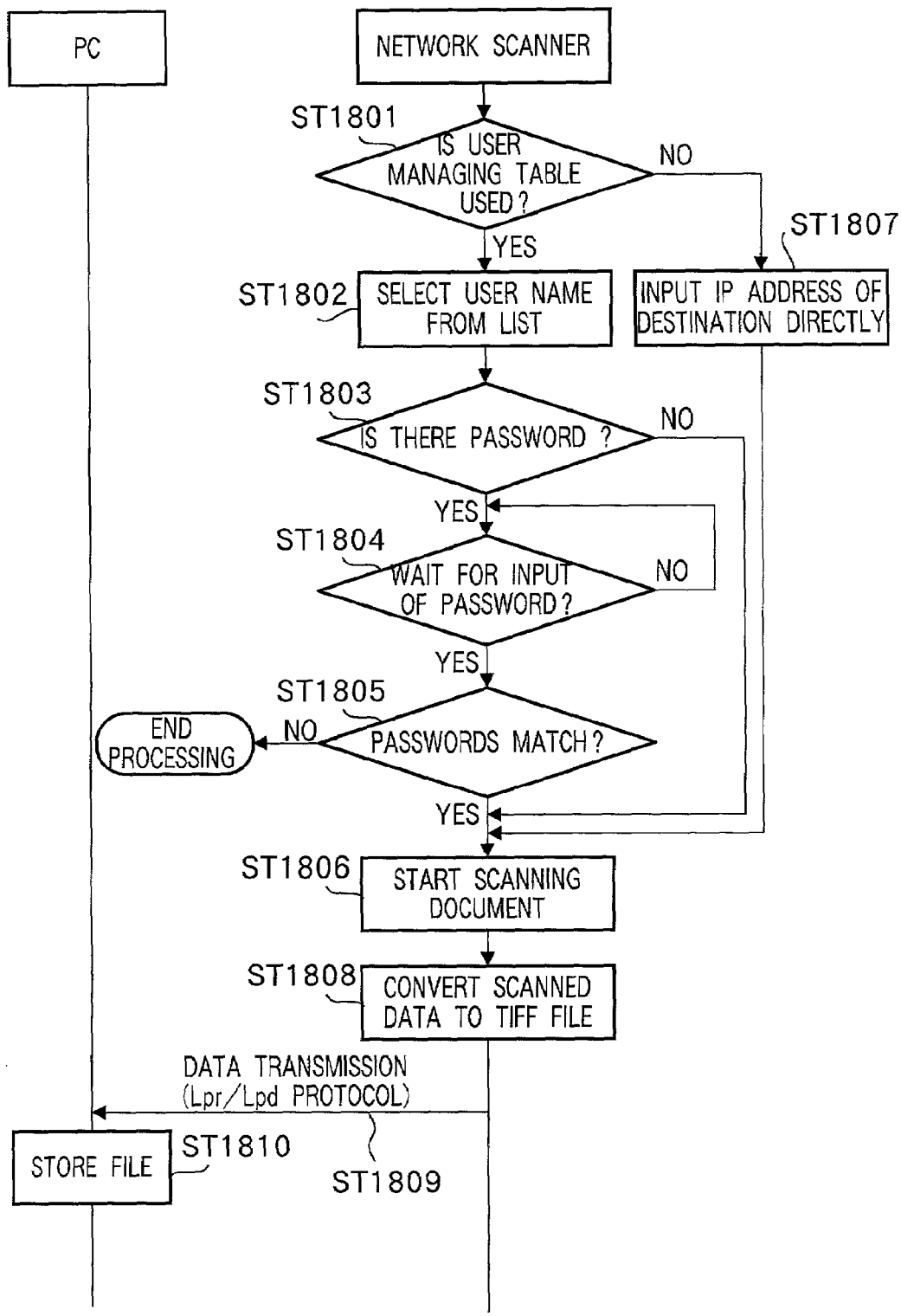
FIG. 18 is a flowchart illustrating steps for transmitting digital image data between the network scanner and the personal computer according to the above embodiment.

FIG. 18 is a flowchart illustrating steps for transmitting digital image data between the network scanner and the personal computer according to the above embodiment.

First, the network scanner 2 selects whether or not the user managing table (address notebook) 170 is used in order to specify a transmission destination of digital image data (ST1801). The network scanner 2 carries out this selection by selecting an address notebook menu from menus. In the case where the use of user managing table 170 is selected in ST1801 (YES), the network scanner 2 displays the user name registered to the user managing table 170 in the form of list, for example, on an LCD provided at the control panel 27, and instructs the user to select the user name (ST1802). If the user name is selected, the IP address of PC3 registered to the user managing table 170 to be associated with this user name is called up and specified as a destination.

Sequentially, the network scanner 2 determines whether or not the password is registered to be associated with the specified IP address (ST1803). If the result is YES, the network scanner 2 displays a message of a request for inputting a password on LCD, and waits for the entry of password (ST1804). If the password is input, the input password is checked against the password registered to the user managing table 170 (ST1805). If both match each other (YES),processing goes to ST1806. If both do not match each other (NO), processing is ended. If no password is registered in ST1804 (NO), processing also goes to ST1806.

On the other hand, if the result is "NO" in ST1801, the user receives the direct input of IP address of the destination using a key provided at the control panel section 27 (ST1807) and processing goes to ST1806.

In ST1806, the scanner 24 of network scanner 2 scans the document and obtains image information. Sequentially, the image file converting program 51 converts image information to an image file with a TIFF format (ST1808). After that, the Lpr transmission program 47 transfers the image file to PC3 as a specified destination according to the foregoing Lpr/Lpt protocol (ST1809). In PC3 that has received the image file, the image file storage processing program 66 stores the image file to the storage section 35 (ST1810).

Figure 19:
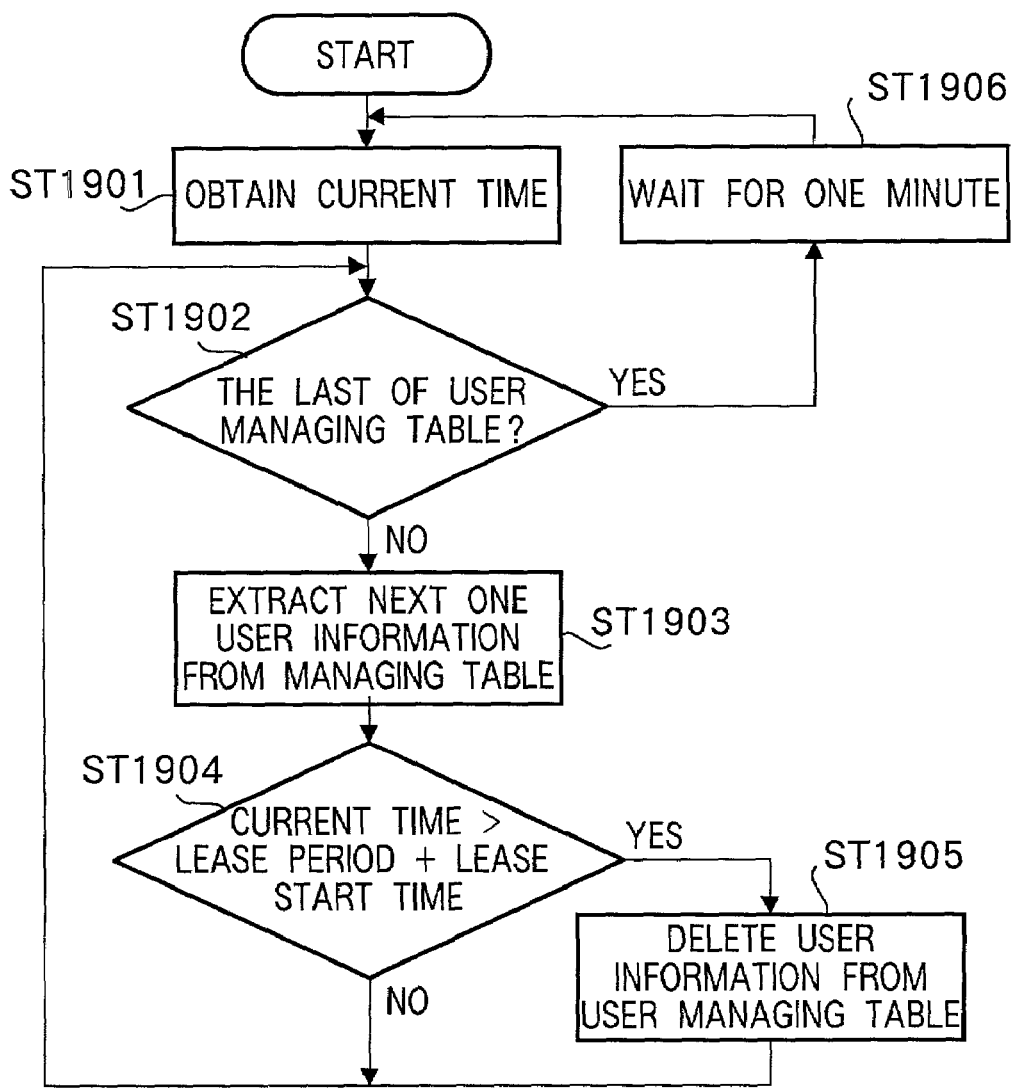
FIG. 19 is a flowchart illustrating steps for managing user information in the network scanner according to the above embodiment.

FIG. 19 is a flowchart illustrating steps for managing user information in the network scanner according to the above embodiment.

The user managing program 52 of network scanner 2 obtains current time from the built-in timer 28 (ST1901). Sequentially, the user managing program 52 confirms whether or not processing has be carried out up to the last of the user managing table 170 (ST1902) and then extracts one user information from the user managing table 170 (ST1903). After that, the user managing program 52 calculates lease end time from the sum of lease period and lease start time in extracted user information and compares the calculation result with current time (ST1904). If current time exceeds lease end time (YES), the user managing program 52 deletes user information from the user managing table 170 (ST1905) and processing goes back to ST1902. On the other hand, if current time does not exceeds lease end time (NO), processing goes back to ST1902 directly. If the user managing program 52 determines that processing has be carried out up to the last of the user managing table 170 (YES) in ST1902, the user managing program 52 waits for predetermined time (for example, one minute) (ST1906) and then processing goes back to ST1901 so as to check leas time repeatedly. In this way, the user managing program 52 performs examination of whether or not the lease period elapses with respect to all user information registered in the user managing table 170.

Figure 20:
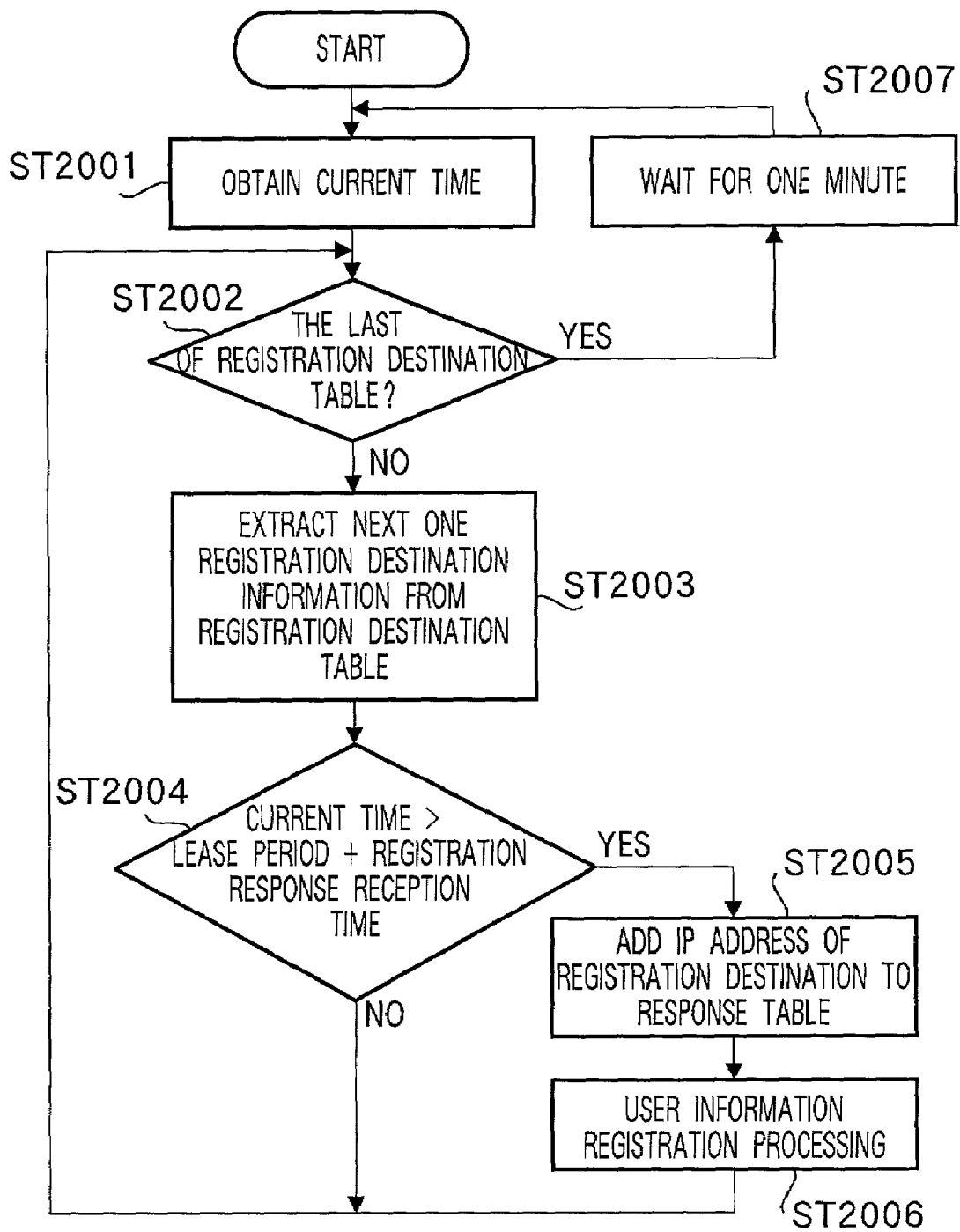
FIG. 20 is a flowchart illustrating steps for registering user information in the personal computer according to the above embodiment.

FIG. 20 is a flowchart illustrating steps for registering user information in the personal computer according to the above embodiment.

The user information registration program 68 of PC3 obtains current time from the built-in timer 38 (ST2001). Sequentially, the user information registration program 68 confirms whether or not processing has be carried out up to the last of the registration destination table 150 of FIG. 15 (ST2002) and then extracts one registration destination information from the registration destination table 150 (ST2003). After that, the user information registration program 68 calculates lease end time from the sum of lease period and registration response reception time in extracted registration destination information and compares the calculation result with current time (ST2004). If current time exceeds lease end time (YES), the user information registration program 68 adds the IP address of network scanner 2 relating to the current registration destination to the response table 120 (ST2005). Sequentially, user information of PC3 is registered to the network scanner 2 (registration destination) according to the steps shown in FIG. 14 (ST2006), and processing goes back to ST2002. On the other hand, if current time does not exceeds lease end time (NO),processing goes back to ST2002 directly. If the user information registration program 68 determines that processing has be carried out up to the last of the user managing table 170 (YES) in ST2002, the user information registration program 68 waits for predetermined time (for example, one minute) (ST2007) and then processing goes back to ST2001 so as to check leas time repeatedly. In this way, the user information registration program 68 registers new user information to all registration destinations (network scanners 2) registered in the registration destination table 150.

As explained above, according to the present invention, since the IP address is re-registered to the network scanner 2 if the effective period (lease period) of IP address obtained by PC3 elapses, an appropriate new IP address is always stored in the network scanner 2. This makes it possible to transmit the image file to PC3 from the network scanner 2 without fail.

Moreover, according to the present invention, since the network scanner 2 deletes the IP address from the user managing table 170 if the effective period (lease period) of IP address obtained by PC3 elapses, only an appropriate new IP address is always stored and used. This makes it possible to transmit the image file to PC3 from the network scanner 2 without fail.

The present invention is not limited to the above embodiment. For example, though the above embodiment has explained the case in which PC is used as a user terminal apparatus, the use of a personal data terminal (PDA), which is connectable to the network, digital TV, and the like may be possible.

This invention may be conveniently implemented using a conventional general purpose digital computer or microprocessor programmed according to the teachings of the present specification, as will be apparent to those skilled in the computer art. Appropriate software coding can readily be prepared by skilled in programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMS, RAMS, EPROMs, EEPROMS, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

As explained above, according to the present invention, since the IP address is re-registered to the network scanner if the lease period of IP addresses obtained by the user terminal apparatus elapses, an appropriate new IP address is always stored in the network scanner. This makes it possible to transmit the image file to the user terminal apparatus from the network scanner without fail.

The present invention is not limited to the above described embodiment, and various variations and modifications may be possible without departing from the scope of the present invention.

This application is based on the Japanese Patent Application No. 2001-26850 filed on Feb. 2, 2001, entire content of which is expressly incorporated by reference herein.

What is claimed is:

1. A scanner apparatus configured to scan image data, comprising:
   an interface configured to be connected to a terminal apparatus via a network, the terminal apparatus being configured to be connected to a DHCP (Dynamic Host Configuration Protocol) server via the network, the DHCP server assigning one IP address to the terminal apparatus, the one IP address being assigned to the terminal apparatus for a predetermined time period; and
   a controller configured to receive, from the terminal apparatus, the one IP address assigned to the terminal apparatus, and to transmit the scanned image data to the terminal apparatus during the predetermined time period, based on the received one IP address assigned to the terminal apparatus,
   the controller being further configured to receive, from the terminal apparatus, another IP address assigned to the terminal apparatus when the predetermined time period elapses, the another IP address being assigned to the terminal apparatus for a further predetermined time period by the DHCP server, and to transmit the scanned image data to the terminal apparatus during the further predetermined time period, based on the another IP address assigned to the terminal apparatus, the another IP address being distinct from the one IP address.

2. The scanner apparatus according to claim 1 further comprising a memory configured to store the one IP address assigned to the terminal apparatus, wherein, when the controller receives the another IP address assigned to the terminal apparatus, the controller deletes the one IP address stored in the memory and stores the another IP address in the memory.

3. The scanner apparatus according to claim 1 further comprising a memory configured to store the one IP address assigned to the terminal apparatus, wherein when the controller receives, from the terminal apparatus, the one IP address assigned to the terminal apparatus and the predetermined time period corresponding to the one IP address, the controller stores, in the memory, the one IP address assigned to the terminal apparatus and the predetermined time period corresponding to the one IP address and deletes the one IP address stored in the memory when the predetermined time period elapses.

4. The scanner apparatus according to claim 1, wherein the controller receives, from the terminal apparatus, a predetermined packet, the predetermined packet being configured to search for the scanner apparatus connectable to the terminal apparatus, the predetermined packet including identification information, the identification information identifying the terminal apparatus, and the controller transmits, to the terminal apparatus, a response to the predetermined packet when the identification information included in the predetermined packet matches identification information of the scanner apparatus.

5. The scanner apparatus according to claim 4, wherein the response to the predetermined packet includes an IP address of the scanner apparatus.

6. The scanner apparatus according to the claim 5, wherein the controller receives, from the terminal apparatus, the IP address assigned to the terminal apparatus, the IP address assigned to the terminal apparatus being transmitted from the terminal apparatus to the scanner apparatus using the IP address of the scanner apparatus included in the response to the predetermined packet.

7. A terminal apparatus, comprising:
   an interface configured to be connected to a DHCP (Dynamic Host Configuration Protocol) server via a network, the DHCP server assigning one IP address to the terminal apparatus, the one IP address being assigned to the terminal apparatus for a predetermined time period, the interface further being configured to be connected to a scanner apparatus via the network, the scanner apparatus transmitting scanned image data to the terminal apparatus; and
   a controller configured to transmit, to the scanner apparatus, the one IP address assigned to the terminal apparatus, and to transmit, to the scanner apparatus, another the IP address assigned to the terminal apparatus when the predetermined time period elapses, the another IP address being assigned to the terminal apparatus for a further predetermined time period by the DHCP server, the another IP address being distinct from the one IP address.

8. The terminal apparatus according to claim 7, wherein the controller transmits, to the scanner apparatus, a predetermined packet, the predetermined packet being configured to search for the scanner apparatus connectable to the terminal apparatus, and transmits the IP address assigned to the terminal apparatus to the scanner apparatus which transmits, to the terminal apparatus, a response to the predetermined packet.

9. The terminal apparatus according to claim 8, wherein the predetermined packet includes identification information, the identification information identifying the terminal apparatus, and the scanner apparatus transmits, to the terminal apparatus, the response to the predetermined packet when the identification information included in the predetermined packet matches identification information of the scanner apparatus.

10. The terminal apparatus according to claim 9, wherein the response to the predetermined packet includes an IP address of the scanner apparatus.

11. The terminal apparatus according to the claim 10, wherein the controller transmits, to the scanner apparatus, the IP address assigned to the terminal apparatus, using the IP address of the scanner apparatus included in the response to the predetermined packet.

12. An image information transmitting system, comprising:
   a terminal apparatus configured to be connected to a DHCP (Dynamic Host Configuration Protocol) server via a network, the DHCP server assigning one IP address to the terminal apparatus, the one IP address being assigned to the terminal apparatus for a predetermined time period; and
   a scanner apparatus configured to be connected to the terminal apparatus via the network, to receive, from the terminal apparatus, the one IP address assigned to the terminal apparatus, to scan image data, and to transmit the scanned image data to the terminal apparatus during the predetermined time period, based on the one IP address assigned to the terminal apparatus,
   the scanner apparatus being further configured to receive, from the terminal apparatus, another IP address assigned to the terminal apparatus when the predetermined time period elapses, the another IP address being assigned to the terminal apparatus for a further predetermined time period by the DHCP server, and to transmit the scanned image data to the terminal apparatus during the further predetermined time period, based on the another IP address assigned to the terminal apparatus, the another IP address being distinct from the one IP address.

13. A method for storing an IP address of a terminal apparatus in a scanner apparatus, the terminal apparatus being connected to a DHCP (Dynamic Host Configuration Protocol) server via a network, the DHCP server assigning one IP address to the terminal apparatus, the one IP address being assigned to the terminal apparatus for a predetermined time period, the scanner apparatus being connected to the terminal apparatus via the network and transmitting scanned image data to the terminal apparatus, the method comprising:
   receiving, at the scanner apparatus from the terminal apparatus, the one IP address assigned to the terminal apparatus;
   storing the one IP address assigned to the terminal apparatus in the scanner apparatus;
   transmitting, at the scanner apparatus, the scanned image data to the terminal apparatus during the predetermined time period, based on the stored one IP address assigned to the terminal apparatus;
   deleting the one IP address stored in the scanner apparatus when the predetermined time period elapses, the predetermined time period indicating a time period for which the one IP address is assigned to the terminal apparatus;
   receiving, at the scanner apparatus from the terminal apparatus, another IP address assigned to the terminal apparatus, the another IP address being assigned to the terminal apparatus for a further predetermined time period by the DHCP server, the another IP address being distinct from the one IP address;
   storing the received another IP address assigned to the terminal apparatus in the scanner apparatus; and
   transmitting, at the scanner apparatus, the scanned image data to the terminal apparatus during the further predetermined time period, based on the stored another IP address assigned to the terminal apparatus.

* * * * *